Dec. 14, 1943.　　　P. O. E. PALMQUIST　　　2,336,747
LEAD CHECKING FIXTURE
Filed Sept. 16, 1942　　　2 Sheets-Sheet 1

INVENTOR
Per O. E. Palmquist.
BY
Harris, Dickey & Pierce
ATTORNEYS.

Dec. 14, 1943. P. O. E. PALMQUIST 2,336,747
LEAD CHECKING FIXTURE
Filed Sept. 16, 1942 2 Sheets-Sheet 2

INVENTOR.
Per O. E. Palmquist.
BY
Harness, Dickey & Pierce
ATTORNEYS.

Patented Dec. 14, 1943

2,336,747

UNITED STATES PATENT OFFICE 2,336,747

LEAD CHECKING FIXTURE

Per O. E. Palmquist, Detroit, Mich., assignor to Michigan Tool Company, Detroit, Mich., a corporation of Delaware Application September 16, 1942, Serial No. 458,531

1 Claim. (Cl. 33—179.5)

The present invention relates to the type of device disclosed and claimed in Pelphrey Patent No. 2,057,970, issued October 20, 1936.

One of the primary objects of the present invention is to provide improvements in devices for accurately checking the lead, pressure angle, and tooth spacing of worms of the globoidal or Hindley type.

Another object of the invention is to provide improvements in devices of the type mentioned which are adapted for quickly checking worms produced in large quantities.

Other objects of the invention will become apparent from the following specification, the drawings relating thereto, and from the claim hereinafter set forth.

In the drawings, in which like numerals are used to designate like parts in the several views throughout:

Figures 1, 2:
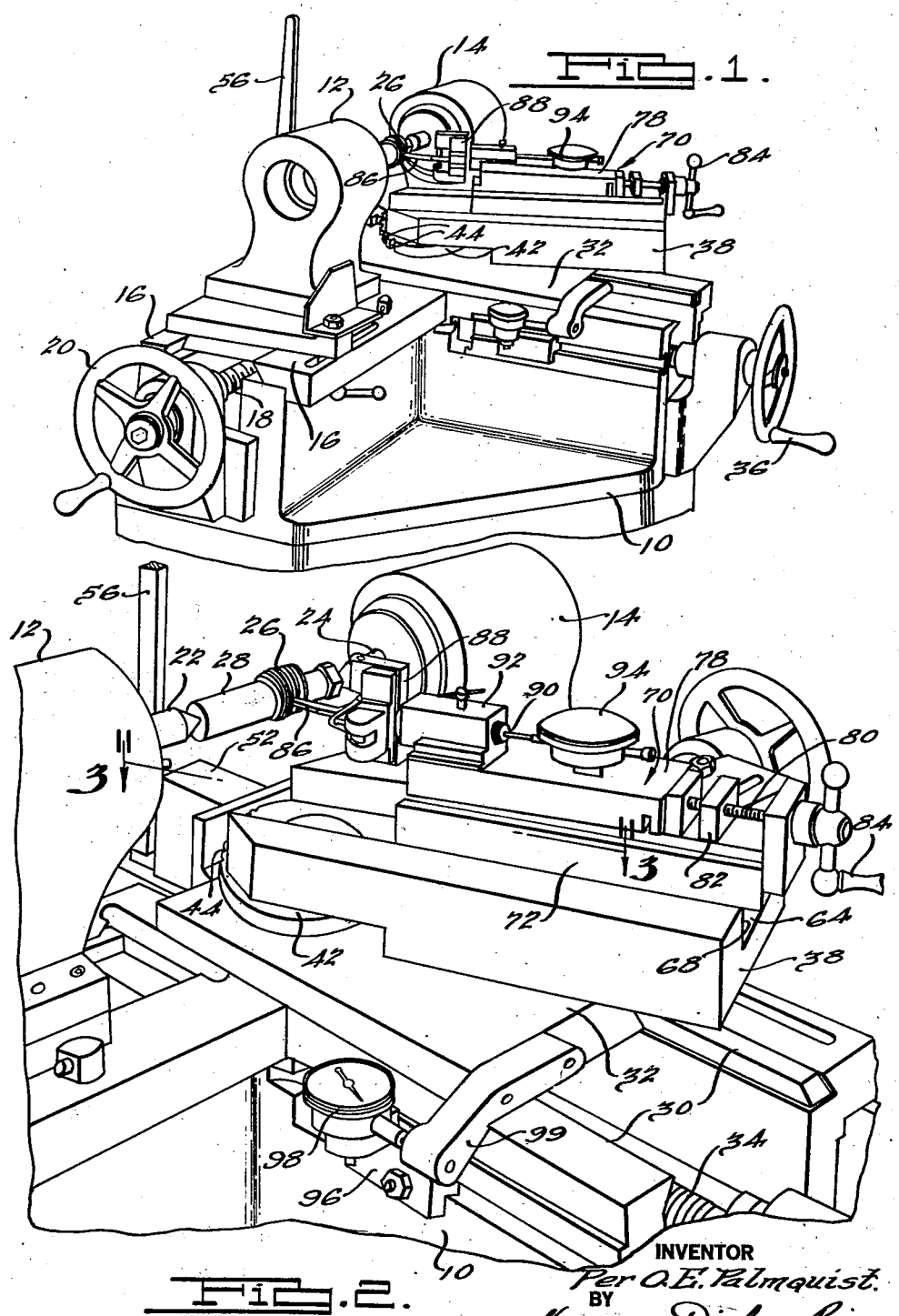
Figure 1 is a perspective of a checking device embodying features of the present invention.
Fig. 2 is an enlarged, partial perspective view of the structure shown in Fig. 1.
Figure 3:
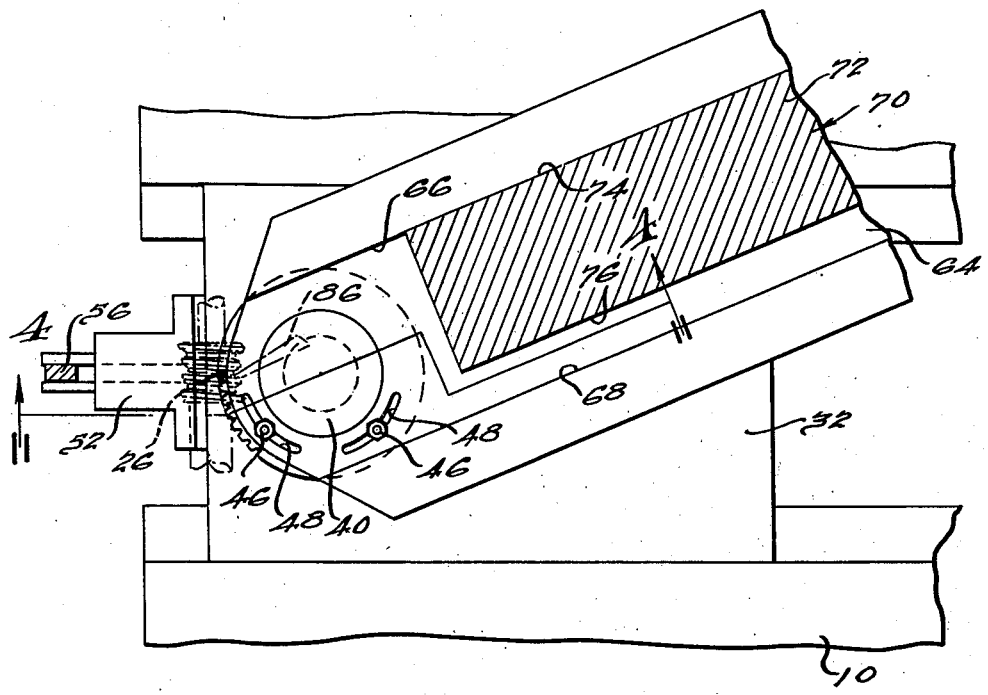
Fig. 3 is a cross-sectional view taken substantially along the line 3—3 of Fig. 2.
Figure 4:
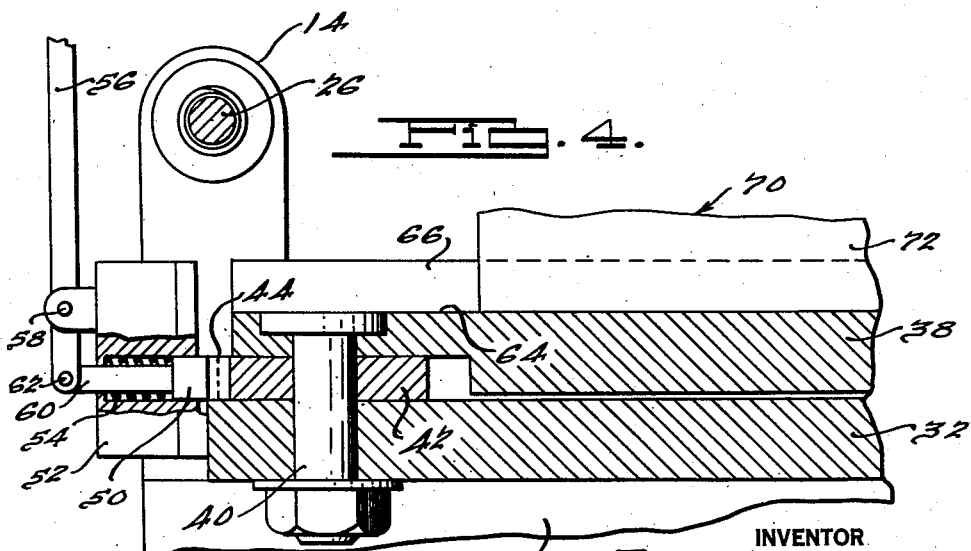
Fig. 4 is a cross-sectional view, with parts broken away, taken substantially along the line 4—4 of Fig. 3.

Worm gears of the globoidal or Hindley type, to which the present invention particularly relates, are characterized in that lines drawn in a plane of the axis of the worm as extensions in such plane of the tooth faces of the worm are all tangent to a base circle which may, for convenience, be called the base circle of the worm. Such circle is constructed with the axis of the worm wheel of mating capacity with the worm and positioned in mating relation thereto. For each worm the spacing between the center of the base circle thereof and the axis of the worm is determined primarily by the radius of the worm wheel with which the worm is designed to mate and the radius of the base circle is determined by the pressure angle of the teeth of the worm. The tangential relation between the lines representing extensions of the tooth sides and the base circle of the worm is utilized in the worm checking construction of the present invention.

The structure of the present invention is particularly adapted for checking worms, all of which have the same base circle. The worms to be checked may mate with gears of different center distances, but, in the use of the present device, the base circles for the worms checked will be the same. It will be appreciated that the structure of the present invention may be designed, by varying the proportions and dimensions, for different base circles; but for any one checking device designed, such device will be utilized for checking worms of a single, predetermined base circle. The device has utility in mass production checking because it can be accurately constructed; and the set-up time, for a particular worm, is reduced to a minimum. Not only is the set-up time reduced, but errors in set-up are eliminated so that the results produced by the device of the present invention are more accurate than in the use of prior constructions.

Referring to the drawings, the checking device includes a standard 10 having a head stock 12 and a tail stock 14 slidably mounted on ways 16. A lead screw 18 having an operating wheel 20 is operably connected to the head stock 12 for sliding such head stock along the ways. A similar lead screw and operating handle are associated with the tail stock 14 on the opposite side of the standard for sliding the tail stock along the ways. Dead centers 22 and 24 are mounted in the head stock and tail stock, respectively, and such centers are adapted to receive therebetween the worm 26 to be checked. Such worm is so mounted on the centers that it may rotate thereon, and it will be understood that the head and tail stocks are so positioned that the longitudinal center of the threaded portion of the worm is centered on the device. A gage block 28 may be positioned over one of the ends of the worm so that, with the head stock 12 in a predetermined position and with the use of the gage block, it will not be necessary to check each worm that is placed on the device to determine that the threaded center is in the proper position. After the first setting, and with the use of the mounting gage block, it will be merely necessary to insert the end of the worm into the gage block 28 and then run the tail stock 14 up to position so that the tooth portion of the worm is properly centered.

The standard 10 has other ways 30 mounted thereon which are at a right angle to the ways 16. Such ways 30 slidably receive thereon a supporting plate 32. A lead screw 34 is associated with the plate 32 and has an operating handle 36 associated therewith for moving the slide plate 32 toward and from the axis of the worm 26.

A supporting table 38 is pivotally connected to the slide 32 by means of a pivot pin 40. The table 38 has an upwardly offset portion adjacent the forward end thereof through which the pivot pin 40 is received, and an index plate 42 is received within the space provided by the offset, and bears upon the top surface of the member 32. The indexing plate 42 is in the form of a disc which represents a gear of mating capacity with the worm and is provided with a central aperture therethrough, into which the pin 40 is received. The axis of the member 42 is thus coincident with the axis of the pivot pin 40. The member 42 is provided with a plurality of notches 44 around a portion of the front face thereof, and such notches represent positions of the teeth on a gear of mating capacity.

The member 42 is connected to the table 38 by means of bolts and nuts 46 which extend through apertures in the member 42 and extend through arcuate apertures 48 provided in the member 38. Such apertures 48 are on an arc about the axis of pin 40, so that the member 38 may be adjusted with respect to the plate 42 and may be secured in its adjusted position. When secured to the plate 42, the member 38, of course, pivots bodily with the plate 42 about the axis of the pivot pin 40. Thus the table 38 assumes the position that a mating gear would assume with respect to the worm 26 as the various notches 44 are engaged by a stop detent 50.

Such detent 50 is supported within an aperture provided in block 52, which is mounted on the standard 10. The detent 50 is urged toward the notches by means of a compression spring 54, which is disposed within the bore and is operatively connected to an operating handle 56. Such handle 56 is pivotally connected intermediate its ends to the block 52 by a pivot pin 58, with the lower end thereof pivotally connected to a link 60 by means of a pivot pin 62. The link 60 is directly connected to the detent 50. Thus, the member 38 may be adjustably fixed in any one position which would represent one of the various mating positions of a gear with respect to the worm 26.

The member 38 is very accurately formed with a horizontal supporting surface 64 and upstanding side surfaces 66 and 68. Such side surfaces 66 and 68 are vertically disposed and are parallel to each other.

An instrument generally indicated at 70 is provided and such instrument 70 is generally similar to that described in the above mentioned Pelphrey patent. Such instrument 70 includes a block member 72, which is accurately constructed and which has a bottom horizontal surface which slidably rests on the surface 64 of the member 38. The block member 72 is of less width than the space between the side surfaces 66 and 68, and is accurately formed with vertical sides 74 and 76, which are adapted to bear against the side surfaces 66 and 68, respectively.

A slide 78 is slidably mounted on ways on the block 72 for longitudinal sliding movement parallel to the sides of block 72. The slide 78 is thus adjustable longitudinally of the block 72 by a conventional lead screw 80, which is threadably received through a nut 82 fixed to the block 72 and is connected at its inner end to the slide 78. The outer end has a hand crank 84 connected therewith, so that the slide 78 may be moved longitudinally with respect to the block 72.

A checking finger 86, similar to the checking finger employed in the Pelphrey patent, is mounted on a block 88. The block 88 is pivotally connected to the slide 78 for pivotal movement about an horizontal axis by an horizontal pivot pin or plunger 90. Such pivot pin 90 slidably extends through an aperture in block 92 which is integral with the slide 78 and also slidably extends through an aperture in the block 88. The finger 86 is of bell crank shape, and is fulcrumed to the block 88 for pivotal movement about a vertical axis. One arm of the bell crank finger is provided with an adjustably secured stop for cooperation with the operating element or plunger 90 of an extensometer 94. The other arm of the finger is provided with a rearwardly relieved face adapted to have a point contact with a tooth face of the worm 26 to be checked.

Extensometer 94 may be of conventional construction and is suitably secured on the upper surface of the slide 78. It includes the usual recording pointer which responds to the inward and outward movements of the operating plunger 90, which plunger is spring biased to an outward position relative to the extensometer. In accordance with conventional practice, the extensometer 94 may be provided with the usual reading scale, which is rotatable with respect to the body of the extensometer and which, therefore, may be set to provide a zero extensometer reading corresponding to any inward or outward position of the operating plunger 90. As will be further understood, the zero reading selected for operating purposes is usually one in which the bias spring associating with the operating member 90 is under compression so that, as the element engaged by the operating member is retracted, the member 90 follows it, providing an extensometer reading on one side of the zero point and, as the element engaged by the operating member is moved to force the operating member inwardly of the extensometer, a reading is provided on the opposite side of the zero point.

With the finger 86 in the position shown, it is adapted to engage one side of the thread, and for checking the opposite side of the thread, the finger 86 is rotated with the block 88 through 180 degrees about the pivot plunger 90.

The finger 86 is so constructed and arranged that, as the slide 78 is moved with respect to the block 72, the point of the finger which is adapted to engage the thread of the worm, will follow along a line representing a tangent to the base circle of the worm. Any deviations from the straight line, as the finger engages the worm, will be indicated by the extensometer. The side surfaces 66 and 68 are accurately constructed and spaced and the block 72 is of accurate dimensions so that when the side 74 bears against the side surface 66, or when the side 76 bears against the side surface 68, the engaging point on finger 86 will be in a proper position to follow the tangent mentioned above. For checking one side of the thread, the block 72 is against the side surface 66 with the finger 86 in the position shown, and for checking the other side of the thread, the side 76 of block 72 bears against the side surface 68 and the finger is rotated through 180 degrees to its other position. For checking the various portions of the thread along the worm, for lead, thread spacing and pressure angle, the support 38 is indexed for engagement in the various notches 44, as described above.

In checking, the pivot pin 40 is first accurately positioned by lead screw 34 so that the axis of pin 40 represents the axis of a mating gear with the worm positioned in mating relation thereto. In order to accurately set the slide 32 so that this proper center distance is obtained, an indicator block 96 is adjustably mounted on the standard 10 adjacent one of the ways 30 and has an extensometer 98 positioned thereon which is adapted to be engaged by a finger 99 which is mounted to the member 32 for sliding movement therewith. Thus the proper center distances may be accurately set for each of the worms to be checked.

What is claimed is:

Checking mechanism for worms comprising, in combination, means for rotatably supporting a worm, a support member, means mounting said first named means and said support member for relative movement toward and from each other, a table member having a supporting surface and parallel side surfaces, means mounting said table member on said support member for bodily rotation about an axis coincident with the axis of a worm wheel of mating capacity with and positioned in mating relation to said worm, a block member supported on said supporting surface, said block member having parallel sides adapted to bear against side surfaces, a slide member mounted on ways on said block member for movement parallel to said sides, and checking means including a checking finger mounted on said slide member, said side surfaces and said block member being so proportioned and said checking finger being so constructed and arranged on said block member that when either side of said block member bears against its adjacent side surface said finger is positioned so as to move into and out of coincidence with a tangent to the base circle of the worm.

PER O. E. PALMQUIST.